Patented Aug. 24, 1937

2,091,164

UNITED STATES PATENT OFFICE 2,091,164

PROCESS OF PREPARING MOLDED ARTICLES

Fritz Seebach, Erkner, near Berlin, Germany, assignor, by mesne assignments, to Bakelite Corporation, New York, N. Y., a corporation of Delaware No Drawing. Application December 29, 1930, Serial No. 505,468. In Germany January 10, 1930

5 Claims. (Cl. 18—55)

The present invention is concerned with a method of preparing molded objects from hardenable phenol-aldehyde condensation products and tung oil, possibly with the addition of fillers or similar materials. It is based on the discovery that tung oil without any preliminary treatment readily unites with resoles, or A-stage hardenable phenolic resins to form homogeneous products, if the resole is heated with the tung oil in the presence of suitable or common solvents, and that the products obtained are especially suitable for the production of molded, hardened objects, particularly after the partial or complete removal of the solvent and with or without the addition of filler or similar substances. As an illustration, it is possible to pour this material into molds and to harden it therein. In view of the great flexibility of the finished product, it is further possible to make sheets and panes of all dimensions. Such panes may be used in all places where there is extreme danger of breaking as, for example, windshields for automobiles.

Several examples illustrating the union of the resole and the tung oil are given below. The homogeneous product obtained according to the examples is freed either partially or completely of solvents, as by boiling or distillation, and is then molded and hardened in the customary way, preferably after the addition of fillers or similar materials. Hence the objects may first be formed and then hardened by heating, or else they may be made by simultaneous use of heat and pressure.

*Example 1.*—Equal parts of tung oil and a hardenable, fusible phenol-aldehyde condensation product from phenol or cresol, formaldehyde and ammonia are heated with an equal weight of methyl cyclohexanol for about 15 minutes at 160° C. The combination between the tung oil and the phenol aldehyde condensation product has taken place by this time, as indicated by sampling and heating a drop on a pane of glass. The film remaining must be clearly transparent and should not show any sort of turbidity whatever.

*Example 2.*—50 kilograms resole from phenol or cresol, formaldehyde and ammonia, 50 kilograms tung oil and 50–100 kilograms of a solvent such as terpineol are kept for 2½ hours at 130° C. After this time, the combination will have taken place.

*Example 3.*—50 kilograms of the hardenable condensation product of phenol or cresol, formaldehyde and ammonia, 50 kilograms tung oil and 75 kilograms of isopropyl alcohol are heated 2 hours at 130° C. in a pressure vessel.

*Example 4.*—50 kilograms resole from phenol or cresol, formaldehyde and ammonia, 50 kilograms tung oil and 100 kilograms isopropyl alcohol are heated for 49 hours at boiling in a reflux condenser. The boiling temperature is 87° C.

*Example 5.*—50 kilograms resole from phenol, or cresol, formaldehyde and ammonia, 50 kilograms tung oil and 100 kilograms of a mixture of methyl cyclohexanol and alcohol (B. P. 100° C.) are kept at the boiling point about 17 hours.

*Example 6.*—50 kilograms of a hardenable resin (in the A or B stage) are acetylated with 100 kilograms acetic anhydride and then treated with 50 kilograms tung oil and 25 kilograms methyl cyclohexanol. After 12 hours of boiling under the reflux condenser combination takes place.

*Example 7.*—50 kilograms of resole from cresol, formaldehyde and ammonia as the catalyst, 50 kilograms tung oil and 100 kilograms acetone are heated 3 hours in an autoclave at 130° C. at 7 atmospheres pressure.

The combination of the tung oil in the hardenable phenol aldehyde condensation products may also be carried out in the presence of fillers, by kneading tung oil, resole, a solvent and a filler, as for example, wood flour, in a heated, closed mixing machine at the proper temperature until the combination of the resole with the tung oil has taken place. The solvent may then be removed in a vacuum, or it may also be left in the mixture.

In place of resoles their derivatives may also be used in like manner for combination with air-drying fatty oils. Thus in place of the resoles their acetyl or benzyl derivatives or methylated or ethylated resole derivatives may be used. It has been further shown that the so-called derivatives of the resitoles, or B-stage resins show the same property, and that therefore these resitole derivatives may also be combined with tung oil in the manner specified.

The hardenable phenol-aldehyde condensation products may be made in any suitable way by the use of proper catalysts, from phenol or its homologs and aldehydes, such as formaldehyde, from homologs or polymers of formaldehyde, from furfural or from other materials giving off formaldehyde. The starting point may also be novolaks, which are used mixed with a suitable hardening agent, such as hexamethylenetetramine. Thus a novolak made with acid may be dissolved up with hexamethylenetetramine and tung oil, so that in the heating step a resole is next formed, which then combines with the tung oil. A mixture of several resoles or a mixture of a resole with novolak and hardeners may also be used. The process may be carried out with a single solvent or with a mixture of solvents. In the tung oil, which is to be reacted with the resole other resins, as for example, natural resins may be dissolved, as well as other materials, which ordinarily do not combine with tung oil, as for example, caoutchouc or rubber.

I claim:

1. Method of preparing molded objects from phenolic condensation products and tung oil which comprises heating a hardenable phenolic condensation product with tung oil in the presence of a mutual non-resinous solvent to unite the condensation product with the oil into a homogeneous condition, thereafter removing solvent, shaping the resulting composition into final form in a mold, and simultaneously hardening the composition by the application of heat.

2. Method of preparing molded objects from phenolic condensation products and tung oil which comprises heating a hardenable phenolic condensation product with tung oil in the presence of a mutual non-resinous solvent to unite the condensation product with the oil into a homogeneous condition, adding a filler to the composition, thereafter removing solvent, shaping the resulting composition into final form in a mold, and simultaneously hardening the composition by the application of heat.

3. Method of preparing molded objects from phenolic condensation products and tung oil which comprises heating a hardenable phenolic condensation product with tung oil in the presence of a cyclohexanol to unite the condensation product with the oil into a homogeneous condition, thereafter removing solvent, shaping the resulting composition into final form in a mold, and simultaneously hardening the composition by the application of heat.

4. Method of preparing molded objects from phenolic condensation products and tung oil which comprises heating substantially equal parts of a hardenable phenolic condensation product with tung oil in the presence of a mutual non-resinous solvent to unite the condensation product with the oil into a homogeneous condition, thereafter removing solvent, shaping the resulting composition into final form in a mold, and simultaneously hardening the composition by the application of heat.

5. Method of preparing molded objects from phenolic condensation products and tung oil which comprises heating a hardenable phenolic condensation product with tung oil in the presence of a mutual non-resinous solvent at about 160° C. for about 15 minutes to unite the condensation product with the oil into a homogeneous condition, thereafter removing solvent, shaping the resulting composition into final form in a mold, and simultaneously hardening the composition by the application of heat.

FRITZ SEEBACH.